United States Patent [19]

Nakamura et al.

[11] Patent Number: 5,177,423
[45] Date of Patent: Jan. 5, 1993

[54] WINDING ARRANGEMENT IN AN AC MOTOR

[75] Inventors: Kosei Nakamura; Yoshiyuki Hayashi; Kazuhisa Numai; Masami Kimijima, all of Yamanashi, Japan

[73] Assignee: Fanuc Ltd., Yamanashi, Japan

[21] Appl. No.: 864,196

[22] PCT Filed: May 31, 1989

[86] PCT No.: PCT/JP89/00543
   § 371 Date: Feb. 12, 1990
   § 102(e) Date: Feb. 12, 1990

[87] PCT Pub. No.: WO89/12926
   PCT Pub. Date: Dec. 28, 1989

Related U.S. Application Data

[63] Continuation of Ser. No. 465,182, Feb. 12, 1990, abandoned.

[30] Foreign Application Priority Data

Jun. 14, 1988 [JP] Japan ................... 63-144851

[51] Int. Cl.⁵ .............................................. H02P 7/36
[52] U.S. Cl. ..................................... 318/767; 318/772
[58] Field of Search .............. 318/737, 748, 754, 756, 318/767, 768, 771, 772, 775, 776, 777, 779; 310/180, 184, 198, 200

[56] References Cited

U.S. PATENT DOCUMENTS

| | | |
|---|---|---|
| 1,074,125 | 9/1913 | Lamme . |
| 1,495,420 | 5/1924 | Lewis . |
| 1,502,909 | 7/1924 | Deflassieux . |
| 1,849,519 | 3/1932 | Gay . |
| 1,992,050 | 2/1935 | Alger . |
| 2,182,646 | 12/1939 | Shutt . |
| 2,380,268 | 7/1945 | Schwarz ................. 318/771 X |
| 2,543,131 | 2/1951 | Seifried ................. 318/245 |
| 2,666,509 | 1/1954 | Jaggi ................. 318/771 |
| 2,707,763 | 5/1955 | Kurtz . |
| 2,727,215 | 12/1955 | Brown . |
| 2,773,230 | 12/1956 | Emley . |
| 3,035,222 | 5/1962 | Stone . |
| 3,302,087 | 1/1967 | Rawcliffe et al. . |
| 4,446,415 | 5/1984 | Taylor et al. ............. 318/771 X |
| 4,654,566 | 3/1987 | Erdman ................. 318/254 |
| 4,675,591 | 6/1987 | Pleiss ................. 318/771 X |

FOREIGN PATENT DOCUMENTS 55-12746 1/1980 Japan .
62-38958 8/1987 Japan .

Primary Examiner—Bentsu Ro
Attorney, Agent, or Firm—Nikaido, Marmelstein, Murray & Oram

[57] ABSTRACT

A spindle motor for a machine tool is required to operate at a low rotational speed and to deliver a high output in a machining mode, and is required to operate at a high rotational speed and to deliver a high output in another machining mode. An AC motor employing a winding arrangement of the present invention meets those operating conditions for different machining modes, in that the coils (X1, X2; X1', X2') of each winding for a phase are divided into a plurality of sets of coils, and the plurality of sets of coils are held in a slot (SL). The connection of terminals (U1, U2; V1, V2; W1, W2) for phase dividing the coils into the sets is changed selectively by switching unit (SW, SW') such as an electromagnetic relay, to thereby supply power selectively to the coils for the output regulation.

2 Claims, 4 Drawing Sheets

WINDING ARRANGEMENT IN AN AC MOTOR

This application is a continuation of application Ser. No. 465,182 filed Feb. 12, 1990, now abandoned.

TECHNICAL FIELD

The present invention relates to a winding arrangement in an AC motor capable of varying the rotating speed in a wide range from a low rotating speed to a high rotating speed without significantly varying the output. The AC motor can be applied as a spindle motor capable of providing a high power over a wide range of rotation speeds.

BACKGROUND ART

In a C-axis control of the angular position of the spindle motor of a machine tool for a contour machining, the spindle must be smoothly rotated at a very low rotating speed and the spindle motor must deliver a high output, and during a usual machining, the spindle motor must be operated at a high rotational speed and deliver a high output.

The conventional machine tool is provided with two motors, namely, one for low-speed machining and the other for high-speed machining, to meet those two requirements, but such a drive system of the conventional machine tool is costly and requires a large floor space. Another system employs belts and gears to maintain a high output for machining over a range of from a low-speed to a high-speed, which also requires an increased floor space.

DISCLOSURE OF THE INVENTION

Accordingly, an object of the present invention is to provide an AC motor capable of maintaining a high output over a wide range of rotational speeds and able to use less floor space.

In view of the above object, the present invention provides a winding arrangement in an AC motor, comprising power-carrying windings respectively for phases, each of the windings including a plurality of sets of coils held in slots of the AC motor for a corresponding phase. The ends of each set of coils are connected to a plurality of terminals for the corresponding phase, and the connection between the terminals and a power source is changed by a switching device.

Since the coils for each phase held in the slots are connected to the terminals, the number of coils in each slot can be decided by selectively connecting the terminals for each phase to the power source by the switching device, whereby the output of the AC motor can be held substantially constantly in a desired range of rotational speed, and the rotational speed can be varied continuously in a range of from a low rotational speed to a high rotational speed, while maintaining a high output.

BEST MODE OF CARRYING OUT THE INVENTION

Figure 1:
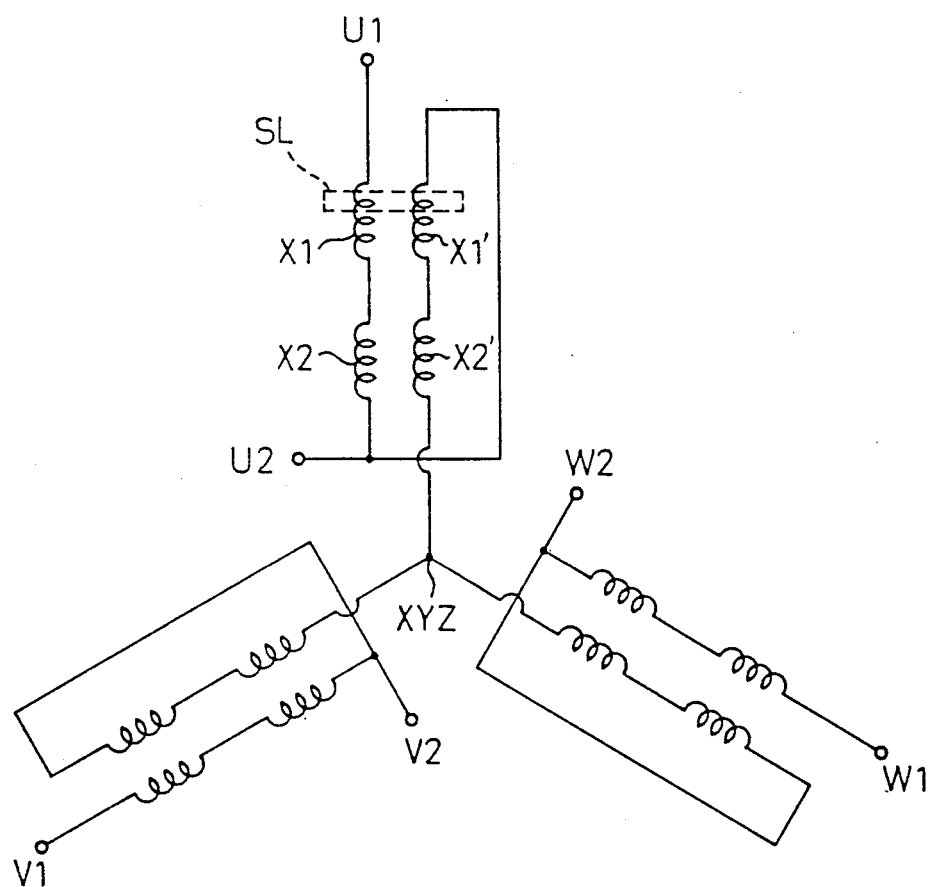
FIG. 1 is an illustration of a typical winding arrangement in a first embodiment according to the present invention.
Figure 2:
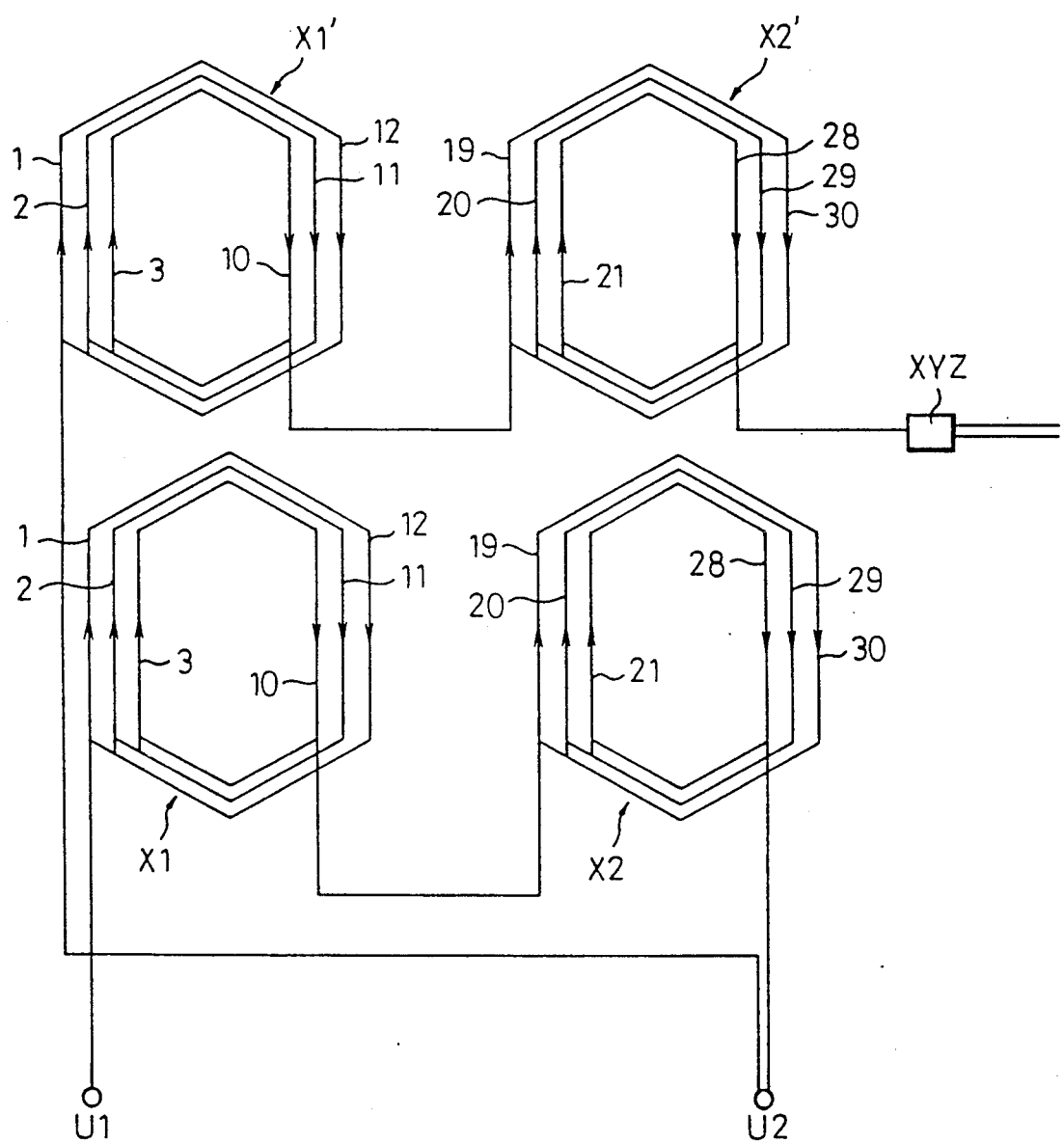
FIG. 2 is a diagrammatic view showing the arrangement of windings for one of a plurality of phases in connection with the slots.

Preferred embodiments of the present invention will be described hereinafter with reference to the accompanying drawings. FIG. 1 shows star-connected U-, V- and W-windings for a three-phase AC motor; and FIG. 2 shows a winding for phase U in an actual arrangement in connection with slot position denoted by reference numerals 1, 2, 3 and the like. The U-, V- and W-windings are joined electrically at a neutral point XYZ. Since the U-, V- and W-phase windings have the same construction, only the U-phase winding will be described hereinafter.

Both ends of the U-phase winding are connected, respectively, to the neutral point XYZ and a terminal U1. In this example, the AC motor is assumed to be provided with thirty-six slots. A wire starting from the terminal U1 is passed through the slots 1, 12, 2, 11, 3 and 10, in that order, to form a coil X1 for a first set, and then through the slots 19, 30, 20 29, 21 and 28, in that order, to form another coil X2 for the first set. The slots are arranged sequentially along a circular direction in the ascending order of the ordinal numbers. The wire passed through the slot 28 is passed again through the slot 1 via a terminal U2, and then the wire is passed through the slots in the same order to form coils X1' and X2' for a second set. After being passed through the last slot 28, the wire is connected to the neutral point XYZ.

In this embodiment, for example, the coils X1 and X2 of the first set are held in the bottom portions of the slots, and the coils X1' and X2' of the second set are held in the upper portions of the slots, namely, portions near the openings of the slots. Although the winding arrangement in this embodiment has only one intermediate terminal, i.e., the terminal U2, the winding arrangement may be provided with any number of intermediate terminals by repeating the coiling procedure according to the coil winding order, as required. With regard to the winding arrangement shown in FIGS. 1 and 2, all the coils X1, X2, X1' and X2' carry currents when power is supplied via the neutral point XYZ and the terminal U1. Currents flows only through the coils X1' and X2' and no current flows through the coils X1 and X2 when power is applied via the neutral point XYZ and the terminal U2. The connection between the terminals and the power source is changed by an electromagnetic relay (MCC) or the like.

When power is supplied to the AC motor in a current control mode, the intensity of a magnetic field created by the U-phase winding is proportional to the number of wiring of a coil held in each slot, namely, the number of turns. Accordingly, the output is proportional to the number of turns and to the rotational speed N. Therefore, when the AC motor operates in a low-speed range, the number of turns must be increased to obtain a high output, because the rotational speed N is low, and when operating in a high-speed range, the output is nearly the same as that produced when the AC motor is operating the low-speed range, even if the number of turns is small. Thus, power is supplied to the terminal U1 to use all the coils in the same slot S when the AC motor is operated at a low rotational speed N, and when the AC motor is operated at a high rotational speed N, power is supplied to a terminal among the plurality of intermediate terminals provided between the coils, to employ an appropriate number of coils. When two terminals are provided for each phase and the respective base rotational speeds NL and NH (referring to FIG. 5) of the low-speed range and the high-speed range are determined, the terminal U2 may be provided so that the number of turns corresponding to the ratio between the rotational speeds is obtained. When power is supplied to the AC motor in a voltage control mode, the output is dependent on the current flowing in a wire of a coil held in each slot, the number of turns of the coil and the rotational speed N, and therefore, the coils joined at the intermediate terminal may be formed, respectively, by conductors having different resistances, such as wires of different materials.

Figure 5:
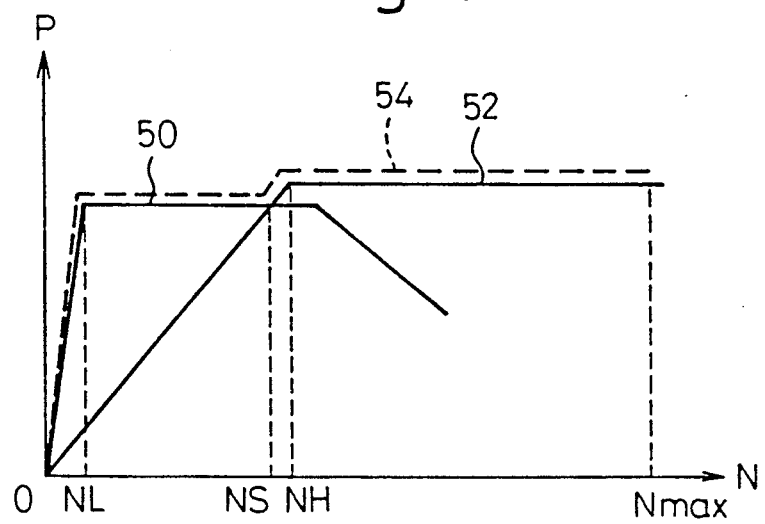
FIG. 5 is a graph showing the output characteristics of an AC motor incorporating a winding arrangement according to the present invention.

FIG. 5 shows the output characteristics of an AC motor employing the winding arrangement of the present invention shown in FIGS. 1 and 2. In FIG. 5, the solid line 50 shows the characteristic curve of the output P vs. the rotational speed N when the AC motor operates in a low-speed range represented by the base rotational speed NL, and another solid line 52 shows the characteristic curve of the output P vs. the rotational speed N when the AC motor operates in a high-speed range represented by the base rotational speed NH. The AC motor exhibits output characteristics, as indicated by the dashed line 54, varying slightly in a range between the base rotational speed NL and an allowed maximum rotational speed $N_{max}$ when the number of operating coils is changed at a rotational speed NS corresponding to the intersection of the characteristics curves 50 and 52. Namely, all the coils X1, X2, X1' and X2' for each phase are used when the AC motor is operated in the low-speed range, and only the coils X1' and X2' are used when the AC motor is operated in the high-speed range.

Figure 3:
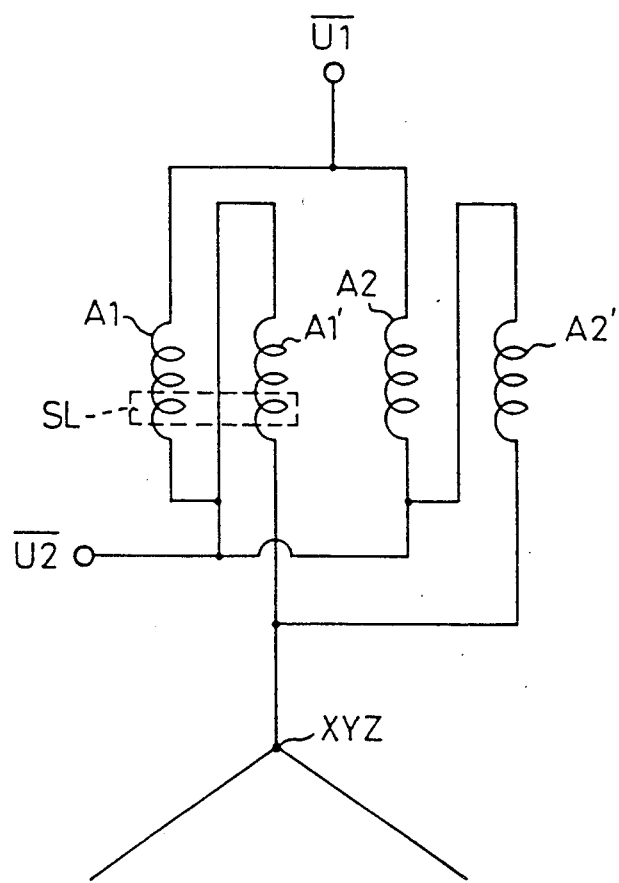
FIG. 3 is an illustration of a typical winding arrangement in a second embodiment according to the present invention.

In the embodiment shown in FIGS. 1 and 2, the coils are connected in series. FIG. 3 shows a winding arrangement in a second embodiment according to the present invention, in which each winding consists of coils connected in series and in parallel. In FIG. 3, a rectangle SL indicated by broken lines represents a slot. When power is supplied to a terminal U1, all the coils A1, A2, A1' and A2' are used, and when power is supplied to a terminal U2, only the coils A1' and A2' are used so that one of the coils in each slot does not carry a current.

Figure 4:
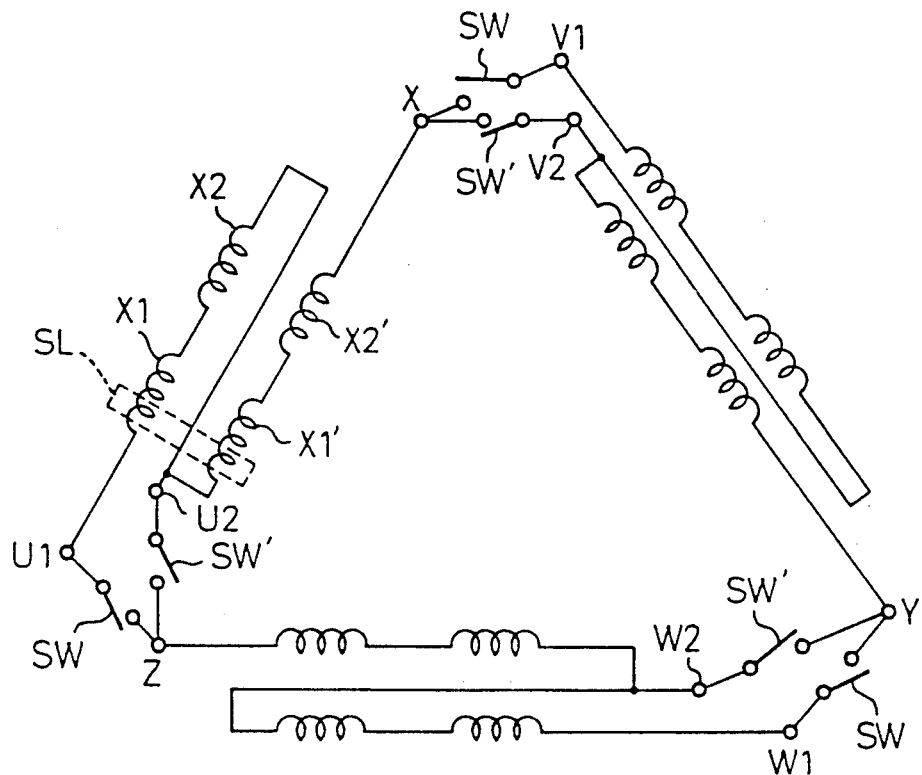
FIG. 4 is an illustration of a typical winding arrangement in a third embodiment according to the present invention.

In the embodiments shown in FIGS. 1 to 3, the windings are connected in a star connection. In a winding arrangement in a third embodiment according to the present invention shown in FIG. 4, in which winding are connected in a delta connection. The four coils X1, X2, X1' and X2' of the U-phase winding are connected, similar to those of the winding arrangement shown in FIG. 1, in series. Portions of the two coils (for example, the coils X1 and X1') are held in one slot represented by a rectangle SL indicated by broken lines. When an AC motor employing this winding arrangement is operated in a low-speed range, switches SW are closed and switches SW' are opened to supply power to the phase U, V and W, respectively via terminals U1, V1 and W1, and when the AC motor is operated in a high-speed range, the switches SW' are closed and the switches SW are opened to supply power to the phase U, V and W via terminals U2, V2 and W2. In the latter case, with regard to the phase U, only the coils X1' and X2' carry currents.

As apparent from the foregoing description, the present invention enables the AC motor to maintain a high output over a wide range of from a low rotational speed to a high rotational speed, simply by changing the connection of the coils of the windings. Thus, the present invention provides an inexpensive and compact drive unit suitable for a spindle motor for a machine tool, which must operate in both a low-speed range and a high-speed range. Since the intermediate terminals provided between the coils of a winding can be connected to the coils, so that an appropriate number of turns of the coils can be set, and can be provided at a plurality of positions, the ratio between the base rotational speeds of the high-speed range and that of the low-speed range can be optionally set or changed.

We claim:

1. A winding arrangement in an AC motor, comprising:

power carrying windings, connected in a star connection, respectively for phases, each of said windings including a plurality of equivalently preformed sets of coils held in slots of the AC motor for the corresponding phase, ends of each equivalently preformed set of coils are connected to a plurality of terminals for the corresponding phase, and the connection between the terminals and a power source is changed by a switching means wherein in a low speed range, said switching means connects all of said plurality of equivalently preformed sets of coils for each phase in said slots to said power source and in a high speed range only one of said equivalently preformed sets of coils for each phase is connected in said slots by said switching means to said power source.

2. A winding arrangement in an AC motor comprising:

power carrying windings, connected in a delta connection, respectively for phases, each of said windings including a plurality of equivalently preformed sets of coils held in slots of the AC motor for the corresponding phase, ends of each equivalently preformed set of coils are connected to a plurality of terminals for the corresponding phase, and the connection between the terminals and a power source is changed by a switching means wherein in a low speed range, current flows through all of said plurality of equivalently preformed sets of coils for each phase and in a high speed range, current flows through only one of said equivalently preformed sets of coils for each phase.

* * * * *